E. H. SHOLAR.
BALING PRESS.
APPLICATION FILED OCT. 8, 1914.
1,152,057.
Patented Aug. 31, 1915.
4 SHEETS—SHEET 1.
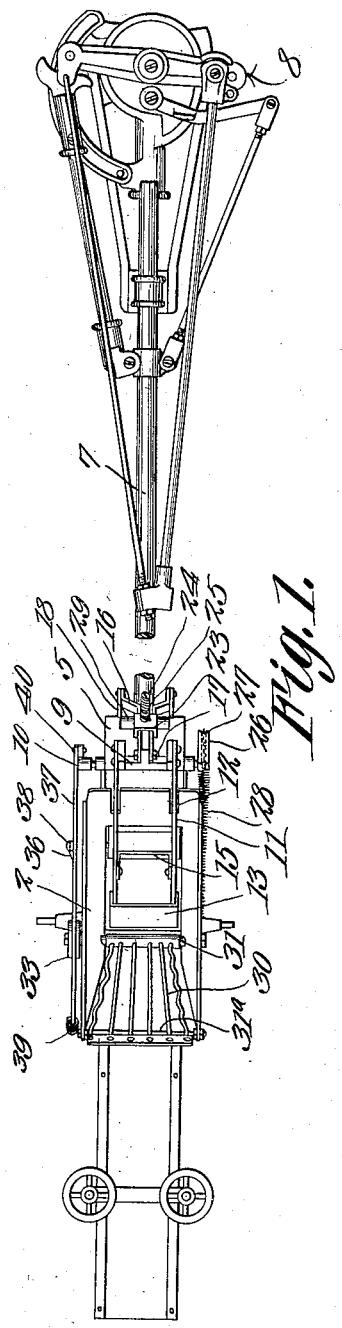
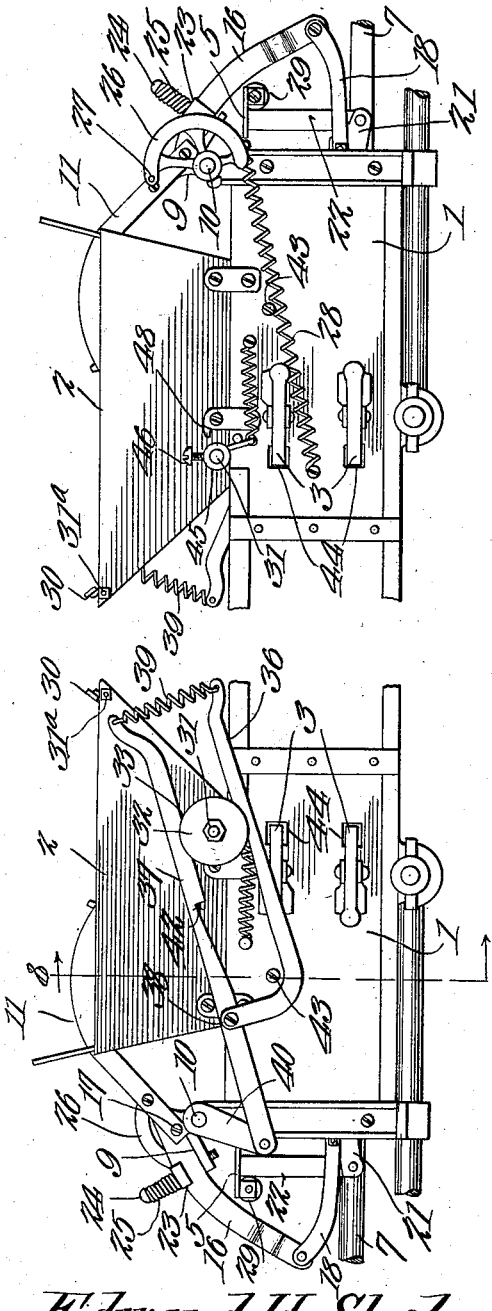
Edward H. Sholar
Inventor,
by C. A. Snow & Co.
Attorneys.
Witnesses

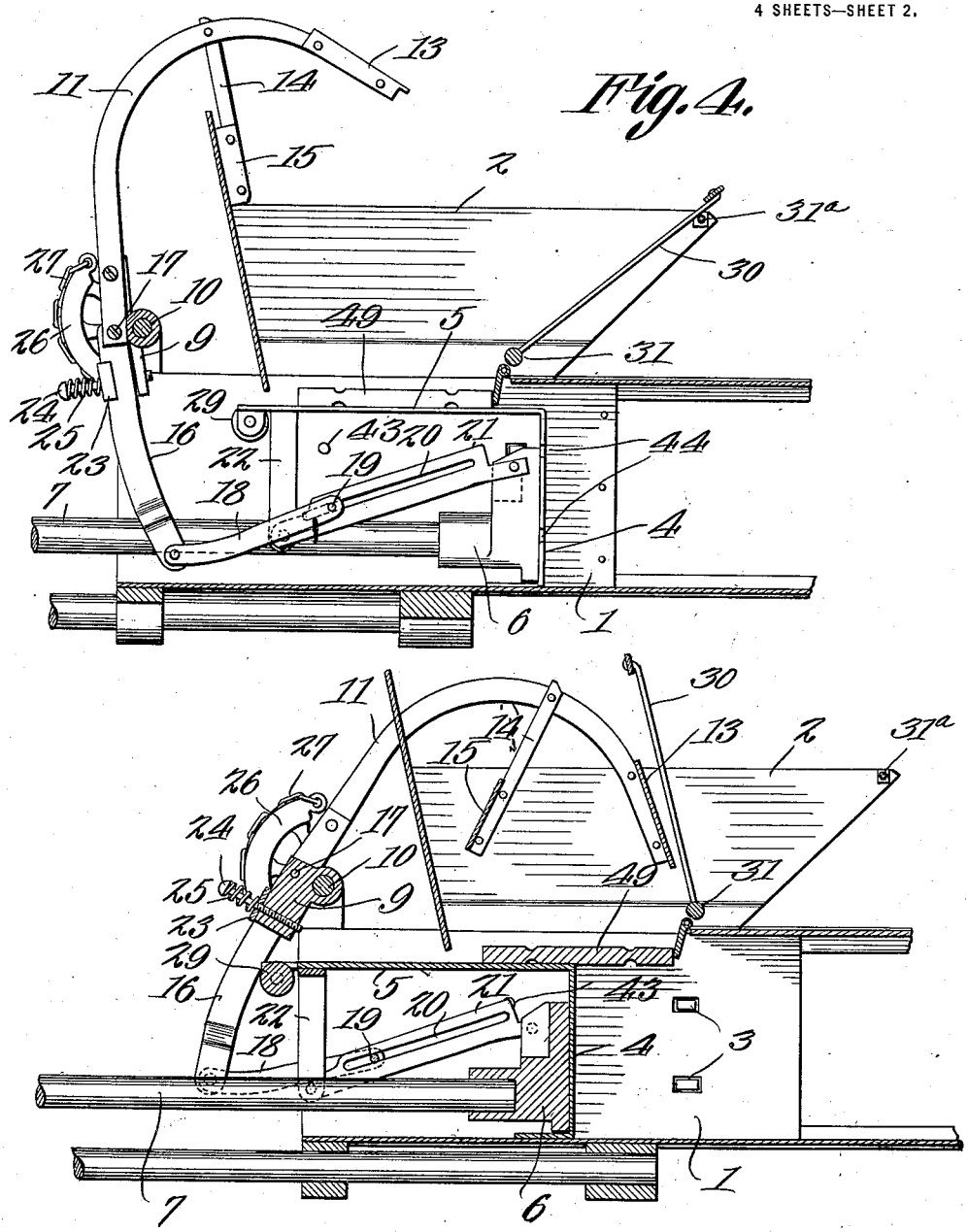

E. H. SHOLAR.
BALING PRESS.
APPLICATION FILED OCT. 8, 1914.
1,152,057.
Patented Aug. 31, 1915.
4 SHEETS—SHEET 3.
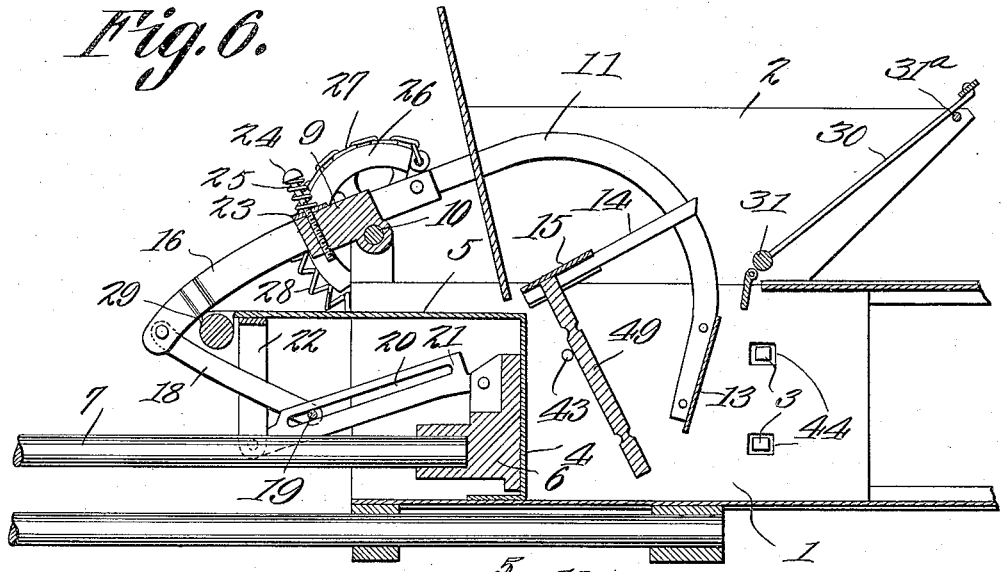
Witnesses
Edward H. Sholar
Inventor,
by C. A. Snow & Co.
Attorneys.

E. H. SHOLAR.
BALING PRESS.
APPLICATION FILED OCT. 8, 1914.
1,152,057.
Patented Aug. 31, 1915.
4 SHEETS—SHEET 4.
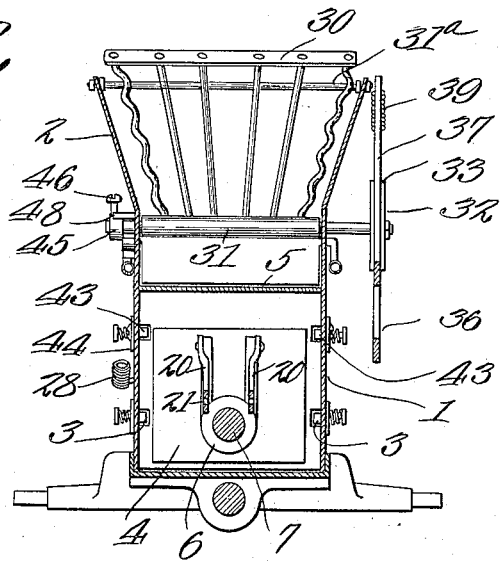
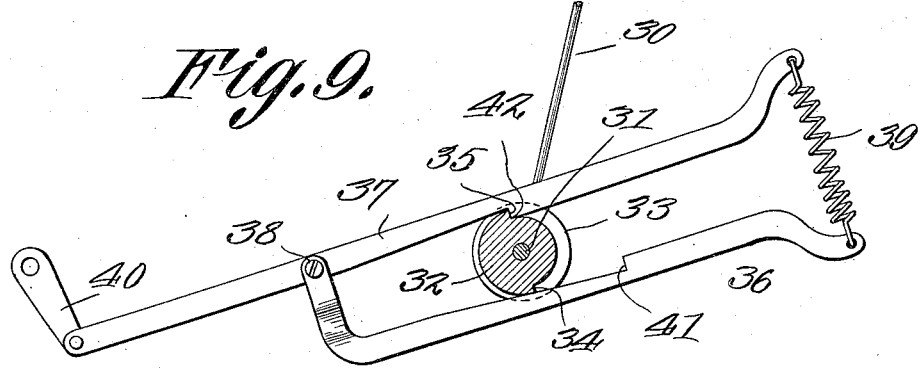
Witnesses
Edward H. Sholar
Inventor,
by C. A. Snow & Co.
Attorneys.

UNITED STATES PATENT OFFICE.

EDWARD HIRAM SHOLAR, OF CHATTANOOGA, TENNESSEE, ASSIGNOR TO CHATTANOOGA IMPLEMENT MANUFACTURING CO., OF CHATTANOOGA, TENNESSEE.

BALING-PRESS.

1,152,057.      Specification of Letters Patent.      Patented Aug. 31, 1915.

Application filed October 8, 1914. Serial No. 865,705.

*To all whom it may concern:*

Be it known that I, EDWARD H. SHOLAR, a citizen of the United States, residing at Chattanooga, in the county of Hamilton and State of Tennessee, have invented a new and useful Baling-Press, of which the following is a specification.

The present invention appertains to baling presses, and has for one object to provide in combination with the feeder, a condenser coöperable with the feeder, and novel means for timely operating the condenser whereby the hay will be condensed just prior to the delivery of the hay or other material into the baling chamber or box, and whereby the hay will be properly held in position and delivered into the baling chamber to best advantage.

Another object of this invention, is to provide novel means for actuating the feeder.

The invention also comprehends the provision of a baling press wherein the spacing or head block may be dropped into the hopper at the proper time, and then automatically or mechanically placed in position, so as to relieve the operator of the duty of placing the spacing block into the baling chamber by hand, which is objectionable for well known and obvious reasons.

It is also within the scope of the invention, to provide the improved features above noted, which may be readily applied to prevailing types of baling presses, and which will be comparatively inexpensive in manufacture and application, as well as being thoroughly practical, serviceable and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:—

Figure 1 is a plan view of the improved baling press, a portion of the plunger rod or pitman being broken away. Fig. 2 is an enlarged side elevation of the baling or compression chamber and accompanying parts, illustrating the feeder at the end of its downward stroke. Fig. 3 is an enlarged side elevation, taken from the opposite direction, with the parts in the same position. Fig. 4 is an enlarged longitudinal section of the parts illustrated in Figs. 2 and 3, the section being taken approximately on the line 4—4 of Fig. 7, and the feeder being illustrated in its raised or idle position. Fig. 5 is an enlarged sectional view taken on the line 5—5 of Fig. 7, and illustrating the feeder started into the hopper, and the condenser moved to coöperable position with the feeder. Fig. 6 is a view similar to Fig. 5, illustrating the feeder in depressed position and in the act of placing the spacing or head block in position within the baling chamber. Fig. 7 is an enlarged front end view of the baling chamber and accompanying parts with the feeder in raised position. Fig. 8 is a cross section taken on the line 8—8 of Fig. 2. Fig. 9 is an enlarged detail view of the actuating means for the condenser, parts being shown in section.

The baling press embodies the usual baling or compression chamber or box 1, having the upper hopper 2 for receiving the hay and conducting it into the compression chamber, the sides of the compression chamber 1 being provided with the usual dogs 3 for holding the hay compressed in rear of the hopper 2. A plunger head 4 is mounted for reciprocatory movement within the baling chamber 1 below the hopper 2, and is provided with an upper rearwardly projecting shutter 5 for closing the discharge opening of the hopper 2 or the entrance opening of the chamber 1, when the plunger 4 is moved forwardly. A casting 6 is secured to the rear side of the plunger head 4 and has engaged therein, the forward end of the plunger rod or pitman 7 which connects the plunger head 4 with the horse power actuating machanism 8 to enable the plunger head to be reciprocated properly, although it is to be understood that any suitable means may be employed for actuating the plunger head without in any way altering the operation of the present mechanism The feeder embodies a casting 9 secured upon a lateral rock shaft 10 journaled to the frame of the press above the forward end of the chamber 1 and in rear of the hopper 2, a pair of curved bars or arms 11 being secured to the casting 9 in any suitable manner and having their free ends overhanging the hopper 2 and projecting rearwardly.

The arms 11 are adapted to work within the slots 12 of the rear end of the hopper 2, when the feeder is oscillated. A plate 13 having a serrated edge is secured to the free ends of the arms 11, to constitute a jaw for the feeder, and a pair of bars 14 are secured to the arms 11 adjacent the jaw 13, and have secured to their free ends, a supplemental or secondary jaw 15 which is normally disposed adjacent the upper portion of the rear end of the hopper 2 when the feeder is raised, while the jaw 13 is disposed sufficiently above the hopper 2, to enable the operator to feed the hay into the hopper.

The actuating mechanism for the feeder, and which is connected to the plunger head 4, embodies a pair of levers 16 having their upper ends fulcrumed, as at 17, to the casting 9, a pair of links 18 being pivoted to the lower ends of the levers 16, and projecting forwardly toward the plunger head 4. A pin 19 is carried by the forward or free ends of the links 18, and works within the slots 20 of a pair of inclined bars or guides 21 carried by the plunger head. The forward or upper ends of the guides 21 are secured to the casting 6 of the plunger head, while the lower or rear ends of the guides 21 are secured to a hanger 22 carried by the rear end of the shutter or closure plate 5. A stem 24 threadedly and adjustably engages the casting 9 between the levers 16 adjacent their fulcrum 17, a bearing plate 23 being slidable upon the stem 24 and seating against the rear edges of the levers 16 and there being an expansion spring 25 upon the said stem 24 and contacting with the bearing plate 23 to yieldably swing the levers 16 rearwardly. In order to swing the feeder upward when the same is free, a segment 26 is secured to one end of the rock shaft 10, and has a chain or other flexible element 27 engaged thereover and attached at one end thereto, and a coiled wire retractile spring 28 is connected to the other end of the chain 27 and corresponding side of the baling chamber 1. The spring 28 thus exerts a tension tending to unwind the chain 27 from the segment 26, to swing the feeder upwardly. A roller 29 is journaled in any suitable manner to the rear end of the shutter 5, to contact with the front edges of the levers 16, when the plunger head is moved rearwardly, to thereby depress the feeder.

The front end of the hopper 2 is open and has disposed therein, between the sides of the hopper, a harp-shaped condenser 30 having its lower end secured to a transverse rock shaft 31 journaled through the sides of the hopper 2 at the front end of the opening between the hopper and baling chamber. The condenser 30 is thus adapted to oscillate between the sides of the hopper to and from the feeder. A cross bar 31ª is engaged through the sides of the hopper adjacent the upper edges and forward ends of the said sides, for supporting the condenser 30 when it is swung forwardly to normal or idle position. Thus, when the condenser 30 is swung forwardly, it will serve as the front end of the hopper, to receive the hay thereon in the usual manner.

The actuating means for the condenser 30, embodies an oscillatory ratchet wheel 32 secured upon one end of the rock shaft 31 of the condenser, and having the side flanges 33, and the diametrically opposite shoulders 34 and 35 facing forwardly, or in opposite directions relative to the circumference of the ratchet wheel. A lower link 36 engages the oscillatory ratchet wheel 32 between the flanges 33 and adjacent the lower shoulder 34, while an upper link 37 engages the upper portion of the ratchet wheel between the flanges 33 and adjacent the upper shoulder 35, the rear end of the link 36 being upturned and pivoted, as at 38, to the link 37 in advance of the ratchet wheel. A retractile spring 39 connects the front or free ends of the links 36 and 37, to pull the links toward one another, and cause them to yieldably engage the periphery of the ratchet wheel. The rear end of the upper link 37 is connected to a crank arm 40 secured to that end of the rock shaft 10 opposite the segment 26, whereby the oscillation of the shaft 10 will impart a reciprocatory movement to the links 36 and 37. The links 36 and 37 are provided with the respective rearwardly facing shoulders 41 and 42 coöperable with the shoulders 34 and 35, respectively, of the ratchet wheel 32. The shoulder 41 of the lower link 36 is spaced forwardly from the shoulders 42 of the upper link for properly oscillating the ratchet wheel 32 and condenser 30 connected thereto.

A pair of stops or lugs 43 are engaged through and project inwardly from the sides of the baling chamber 1, adjacent the rear end of the opening between the baling chamber and hopper, and in the longitudinal lines of the upper dogs 3. The side edges of the plunger head 4 are provided with notches or recesses 44 to enable the plunger head to move past the dogs 3 and stops or lugs 43 without interference.

In order to limit the oscillation of the condenser 30, a collar 45 is engaged upon that end of the rock shaft 31 opposite the ratchet wheel 32, and a set screw 46 is engaged through the collar 45 and bears against the shaft 31 to hold the collar in place. The set screw 46 provides an upwardly projecting finger, which is engageable with a stop 48 secured to the respective side of the hopper. Thus, when the condenser 30 is swung upwardly and rearwardly, the set screw or finger 46 is engageable with the stop 48, to limit the rearward movement of the condenser, and when the condenser is swung forwardly and downwardly, it is engageable with the cross rod 31ª to limit the forward movement of the condenser.

In operation, assuming that the plunger head 4 is moved to the end of its forward stroke, as seen in Fig. 4, the shutter 5 will move below the hopper 2 to close the opening between the hopper and condensing chamber, and the feeder will be returned to raised or idle position under the influence of the spring 28. The operator may then pitch the hay into the hopper 2 under the feeder and onto the condenser 30 and shutter 5 of the plunger head, it being noted that as the plunger head 4 starts to move rearwardly, the feeder will remain idle during a portion of the rearward stroke of the plunger head, to enable the operator to readily place the desired amount of hay into the hopper before the feeder is depressed. Then, after the plunger head 4 has started rearwardly and finished part of its stroke, the bearing roller 29 carried by the rear end of the shutter 5 of the plunger head, will contact with the levers 16, as seen in Fig. 5, and will swing the levers 16 rearwardly to thereby start the downward movement of the feeder into the hopper as seen in the said figure. It is to be noted that the spring 25 permits of a yieldable action between the levers 16 and arms 11 to avoid any sudden operation of the feeder, and to enable the feeder to yield relative to the levers 16 in feeding the hay into the condensing chamber. When the levers 16 are swung to move the feeder downwardly, the rock shaft 10 of the feeder will be oscillated, which will move the crank arm 40 of the said shaft 10 rearwardly, and as a result, the links 36 and 37 will be drawn rearwardly. Ordinarily, when the condenser 30 is swung forwardly, as seen in Fig. 4, the shoulders 41 and 42 of the links 36 and 37 will be disposed in front of the shoulders 34 and 35 respectively, of the ratchet wheel 32, with the shoulder 42 of the upper link 37 in engagement with the shoulder 35 of the ratchet wheel, as seen in Fig. 9. Then, as the links 36 and 37 are drawn rearwardly, as above indicated, the upper link 37 will cause the ratchet wheel 32 to rotate counter-clockwise, as seen in Fig. 9, to swing the condenser 30 upwardly and rearwardly to the position illustrated in Fig. 5. The condenser 30 is thus swung into cooperative relation with the feeder, immediately after the feeder has started to move, and just before the feeder jaws 13 and 15 engage the hay for forcing the same into the condensing chamber. Thus, the condenser 30 condenses the hay by forcing it toward the rear end of the hopper 2, directly under the jaws 13 and 15 of the feeder, and in this manner, the hay is not only condensed prior to the downward movement of the hay by the feeder, but the hay will be directed into the condensing chamber to better advantage. Thus, as the plunger head 4 moves rearwardly, the feeder is depressed through the hopper 2 and into the condensing chamber 1 to deliver the hay into the condensing chamber in front of the plunger head. As the plunger head 4 completes its rearward stroke, the shoulder 42 of the upper link 37 of the condenser actuating means will have disengaged the shoulder 35 of the ratchet wheel 32, and the shoulder 41 of the lower link 36 will be brought into engagement with the lower shoulder 34 of the ratchet wheel 32, to rotate the ratchet wheel 32 clockwise, as seen in Fig. 9, whereby the condenser 30 will be returned forwardly to normal or idle position while the feeder is completing its downward stroke. It will be noted that the bearing roller 29 contacting with the levers 16 to swing them rearwardly will move away from the fulcrum 17 of the levers 16, whereby the feeder will be given a quick initial movement and will then gradually lessen in velocity as the hay is engaged and forced downwardly into the baling chamber 1. It is also to be noted that the spring 39 connects the free ends of the links 36 and 37 to cause the shoulders of the said links to snap into engagement with the shoulders of the ratchet wheel 32 to the ends above noted.

After the plunger head 4 has been moved rearwardly, and the hay fed into the baling chamber 1, the plunger rod or pitman 7 is moved forwardly for compressing the hay within the baling chamber 1 and moving the hay forwardly beyond the dogs 3. As soon as the plunger head 4 starts forwardly, the bearing roller 29 is drawn out of contact with the levers 16 of the feeder, and the feeder will be drawn upwardly under the influence of the returning spring 28, it being noted that the pin 19 of the links 18 connected to the levers 16 may readily move rearwardly within the slots 20 of the guides 21, to enable the feeder to quickly return to raised or idle position. As the feeder is returned to raised position, the links 36 and 37 will be moved forwardly to initial position by the forward movement of the crank arm 40, it being noted that the condenser 30 is returned to initial position prior to the complete downward movement of the feeder, and that the condenser will thus remain idle while the feeder is being raised. The links 36 and 37 moving forwardly will cause the shoulders 41 and 42 of the links to snap idly past the shoulders of the ratchet wheel 32 without operating the condenser. The links 18 having the pin 19 slidably engaging the guides 21 permit the levers 16 to have a limited movement relative to the plunger head, for permitting the feeder to return to raised position when the plunger head is started forwardly, and furthermore, should the spring 28 fail to operate, the guides 21 in being moved forwardly will cause the front ends of the slots 20 to engage the pin 19, whereby the links 18 will be drawn forwardly for forcibly raising the feeder.

In the foregoing manner, as the plunger head 4 is reciprocated, the feeder and condenser will be operated timely to the ends noted.

Another salient or cardinal feature of the present invention resides in the fact that the spacing or head block 49 may be automatically introduced into the baling chamber 1, after the spacing block is dropped into the hopper 2. Thus, as illustrated in Fig. 4, when the plunger head 4 is at the end of its forward stroke, the spacing block 49 may be dropped into the hopper 2 upon the shutter 5 of the plunger head. Then, as the plunger head is moved rearwardly, the shutter 5 will be drawn forwardly from under the spacing block 49, and the forward jaw 13 of the feeder moving downwardly, upon the front end of the spacing block 49, will cause the spacing block to be tilted downwardly in front of the plunger head, as suggested in Fig. 6. The spacing block 49 may thus be kicked properly into the baling chamber 1 in front of the stops or lugs 43, which hold the spacing block in place until the plunger head moves forwardly to carry the spacing block with it for dividing the bales. As suggested in Fig. 6, when the spacing block 49 is not completely depressed into the baling chamber 1 by the upper jaw 13, the supplemental or rear jaw 15 of the feeder will force the spacing block lengthwise into proper position. With the present mechanism, therefore, it is only necessary for the operator to drop the spacing block 49 into the hopper and onto the shutter 5 of the plunger head, so as to avoid the necessity of the operator placing the spacing block manually into the baling chamber, and rendering him liable to injury.

Having thus described the invention, what is claimed as new is:—

1. In a baling press, a hopper, a feeder movable thereinto, a condenser movable between the sides of the hopper to and from the feeder, and means for moving the condenser into coöperative relation with the feeder when the feeder is started downwardly, and returning the condenser to normal position when the feeder is completing its downward stroke.

2. In a baling press, a hopper, an oscillatory feeder movable thereinto from one end of the hopper, an oscillatory condenser having its lower end pivoted within the other end of the hopper, the condenser being movable between the sides of the hopper to and from the feeder, and means for swinging the condenser into coöperative relation with the feeder when the feeder is started downwardly and for returning the condenser to normal position when the feeder is completing its downward movement.

3. In a baling press, a hopper, a feeder movable thereinto, a condenser movable between the sides of the hopper to and from the feeder, means for actuating the feeder, and means operatively connecting the feeder actuating means and condenser for moving the condenser into coöperative relation with the feeder when the feeder is started downwardly and then returning the condenser to normal position when the feeder is completing its downward movement.

4. In a baling press, a hopper, an oscillatory feeder movable thereinto from one end of the hopper, an oscillatory condenser having its lower end pivoted within the other end of the hopper, the condenser being movable between the sides of the hopper to and from the feeder, means for oscillating the feeder, and means operatively connecting the said means and the condenser for moving the condenser into coöperative relation with the feeder when the feeder is started downwardly and then returning the condenser to normal position when the feeder is completing its downward movement.

5. In a baling press, a hopper, an oscillatory feeder movable thereinto, a condenser movable between the sides of the hopper to and from the feeder, actuating means for the feeder including an oscillatory shaft, an oscillatory shaft for swinging the condenser, and means for operatively connecting the said shafts for swinging the condenser into coöperative relation with the feeder when the feeder is started downwardly, and then returning the condenser to normal position when the feeder is completing its downward movement.

6. In a baling press, a hopper, an oscillatory feeder movable thereinto, an oscillatory condenser movable within the hopper to and from the feeder, actuating means for the feeder including an oscillatory shaft, an oscillatory shaft for swinging the condenser, means for operatively connecting the said shafts including a crank arm secured to the first mentioned shaft, a ratchet secured to the second mentioned shaft and having a shoulder, and a link pivoted to the said crank arm and having a shoulder engageable with the shoulder of the ratchet when the feeder is started downwardly to swing the condenser into coöperative relation with the feeder, and means for returning the condenser to normal position after the shoulders are disengaged.

7. In a baling press, a hopper, an oscillatory feeder movable thereinto, an oscillatory condenser movable within the hopper to and from the feeder, actuating means for the feeder including an oscillatory shaft, an oscillatory shaft for swinging the condenser, and means operatively connecting the said shafts including a crank arm secured to the first mentioned shaft, a ratchet wheel secured to the second mentioned shaft and having opposite shoulders, and a pair of links connected to the said crank arm and engaging opposite portions of the ratchet wheel, the links having shoulders which are successively engageable with the shoulders of the ratchet wheel for swinging the condenser into proper relation with the feeder when the feeder is started downwardly, and then returning the condenser to normal position.

8. In a bailing press, a baling chamber, a hopper above same, a plunger head movable within the said chamber and carrying a shutter movable under the hopper, to receive a spacing block thereon, and means for tilting the spacing block downwardly into the baling chamber and then forcing the same lengthwise in front of the plunger head when the plunger head is moved forwardly.

9. In a baling press, a baling chamber, a hopper above same, a pair of lugs projecting inwardly from the sides of said chamber, a plunger head movable within the baling chamber past the said lugs and having an upper shutter movable below the hopper to receive a spacing block thereon, and means for tilting the spacing block downwardly and then forcing the same lengthwise into the baling chamber in front of and in contact with the said lugs when the plunger head is moved forwardly.

10. In a baling press, a baling chamber, a hopper above same, a plunger head movable within the baling chamber and having an upper shutter movable under the hopper to receive a spacing block thereon, and a feeder movable through the hopper and having means for tilting the spacing block downwardly and then forcing the same lengthwise into the baling chamber when the shutter is withdrawn from under the hopper with the plunger head.

11. In a baling press, a baling chamber, a hopper above same, lugs projecting inwardly from the sides of the said chamber, a plunger head movable within the said chamber and having an upper shutter movable below the said hopper to receive a spacing block thereon, and an oscillatory feeder movable downwardly through the hopper and having means for tilting the spacing block downwardly and then forcing the same lengthwise into the said chamber and against the said lugs when the shutter is withdrawn from under the hopper with the plunger head.

12. In a baling press, a baling chamber, a hopper above same, a plunger head movable within the said chamber and having an upper shutter movable below the hopper, to receive a spacing block thereon, and an oscillatory feeder having a pair of jaws movable into the hopper, one jaw being arranged to tilt the spacing block downwardly into the said chamber and the other jaw to force the block lengthwise into said chamber.

13. In a baling press, an oscillatory spring returned feeder having a lever, and a plunger head having means to bear against and work along the said lever for depressing the feeder.

14. In a baling press, an oscillatory spring returned feeder having a yieldable lever, and a plunger head having a roller to contact with and run along the said lever for depressing the feeder.

15. In a baling press, an oscillatory feeder having a lever, a plunger head having an upwardly rearwardly projecting shutter, the shutter having means at its rear end for contacting with the said lever to depress the feeder, a hanger carried by the rear end of the shutter, a slotted guide terminally secured to the said hanger and plunger head, and a link pivoted to the said lever and having a pin working within the slot of the said guide.

In testimony that I claim the foregoing as my own, I have hereto affixed my signature in the presence of two witnesses.

EDWARD HIRAM SHOLAR.

Witnesses:
C. E. JONES,
E. DE L. WOOD.

Copies of this patent may be obtained for five cents each, by addressing the "Commissioner of Patents, Washington, D. C."